Figure 1:
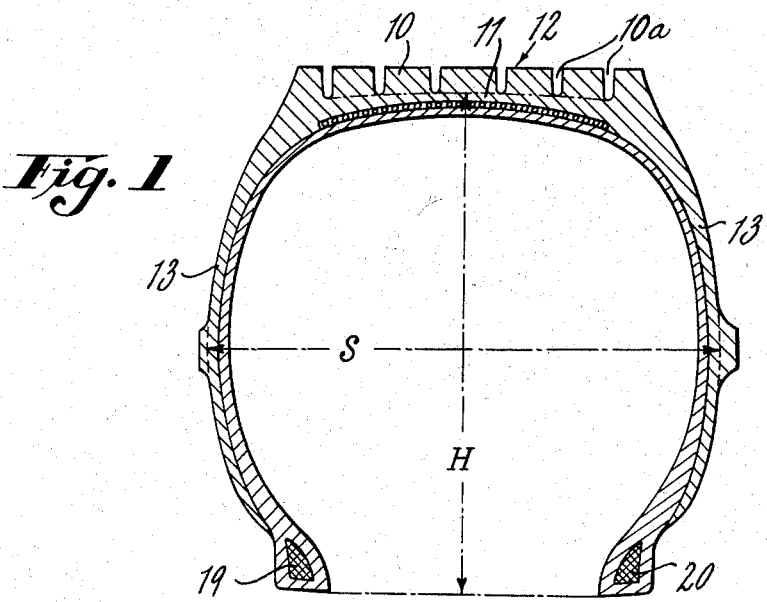

Jan. 20, 1959 S. LIPPMANN ET AL 2,869,610
HIGH-SPEED TIRE
Filed March 4, 1955 2 Sheets-Sheet 1

INVENTORS
SEYMOUR LIPPMANN
MARTIN BERGER
BY Irwin M. Lewis
ATTORNEY

INVENTORS
SEYMOUR LIPPMANN
MARTIN BERGER
BY

ATTORNEY

2,869,610

HIGH-SPEED TIRE

Seymour Lippmann, Detroit, and Martin Berger, Oak Park, Mich., assignors to United States Rubber Company, New York, N. Y., a corporation of New Jersey Application March 4, 1955, Serial No. 492,191

2 Claims. (Cl. 152—330)

This invention relates to a pneumatic tire, primarily intended for use on passenger cars.

The primary object of the invention is to provide a tire which will have such characteristics as softness of ride, steering ease, steering response, and antiskid tread mileage, equal to or superior to those of a conventional passenger car tire when the latter is inflated to pressures currently recommended to provide these properties, i. e., 24 p. s. i. gauge pressure but which, in contrast to such conventional passenger car tires, may be operated for comparatively long periods of time at extremely high speeds, i. e. speeds of 95 to 105 miles per hour without failure. A conventional passenger car tire will fail within a comparatively short period of time if operated at such speeds.

We have found that a tire providing such performance can be built and at a cost not greater than that of a conventional passenger car tire, if a rather unusual combination of structural features, as will hereinafter be described, are incorporated therein. Comparative tests of tires incorporating such a combination of features in accordance with the invention, have shown a power consumption of only 9 to 10 horse power at speeds of 95 to 105 miles per hour as compared to 13 to 30 horse power for conventional passenger car tires, including conventional passenger car tires incorporating nylon cord fabric reinforcement. It might be mentioned that a power consumption of 11 horse power is normally considered as the upper limit of power consumption for satisfactory operation. Power consumption over this limit results in excessive over heating resulting in early failure of the tire.

Other comparative tests on a test wheel of tires constructed in accordance with the invention have shown that such tires will run continuously 15 hours at 95 miles per hour, another 15 hours continuously at 100 miles per hour and still another 15 hours continuously at 105 miles per hour without failure. Conventional passenger car tires, including those incorporating nylon cord fabric, tested under the same test conditions failed after only a fraction of an hour at 95 miles per hour. Road tests of tires constructed in accordance with the present invention showed that such tires ran 100° F. cooler than conventional passenger car tires when operated at 85 miles per hour for approximately 8 hours and showed that such tires developed 25% greater "cornering force" than conventional tires. When these tests were made, the tire was inflated to a gauge pressure of 24 p. s. i. and the tires were run with the recommended load specified in the 1954 Handbook of the Tire and Rim Association.

Figure 2:
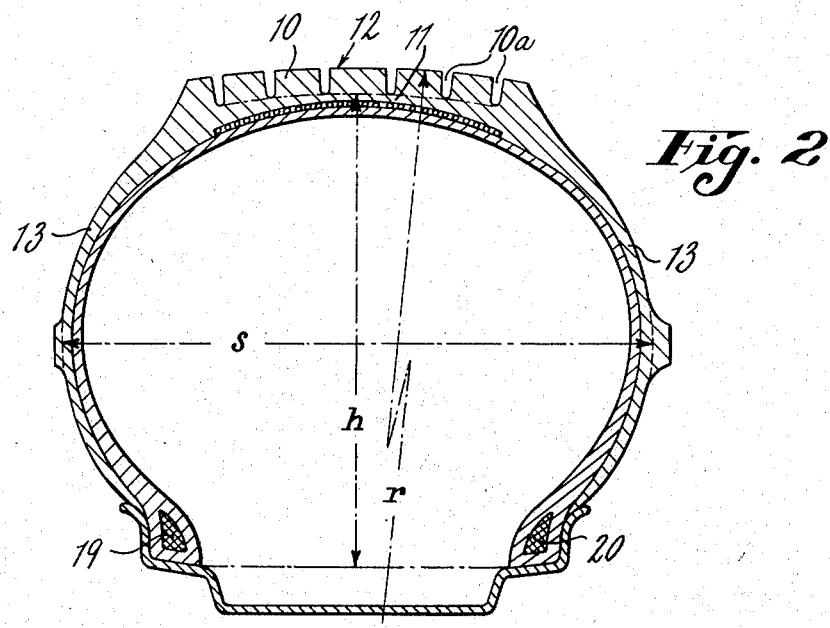
Figure 3:
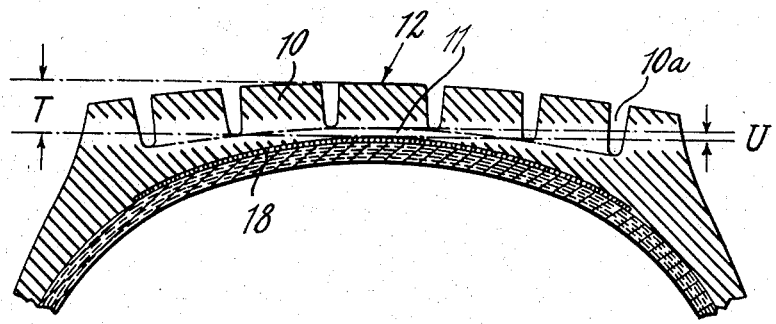
Figure 4:
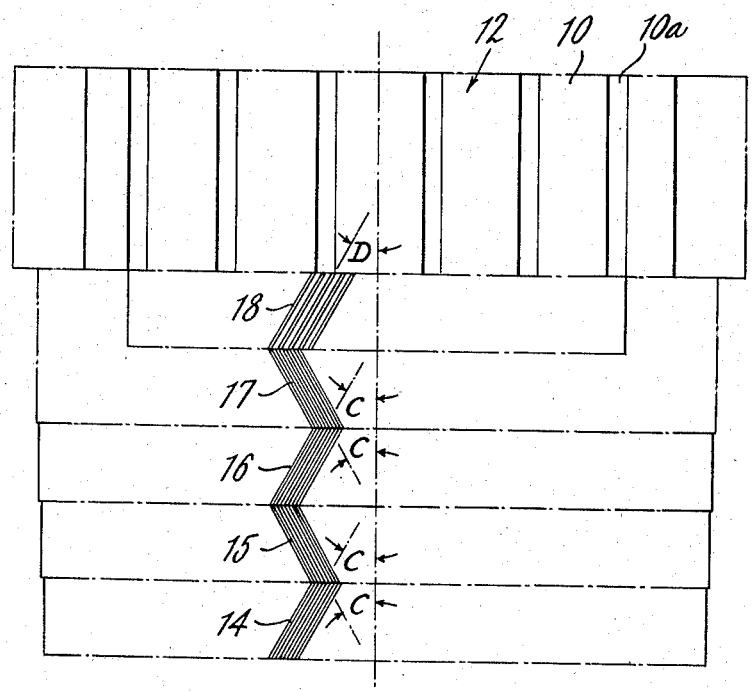

The objects and advantages of the tire of the present invention having been given above, a detailed description of the tire is given hereafter by reference to the accompanying drawings, wherein:

Fig. 1 is a sectional view of a tire constructed in accordance with the present invention showing the tire as taken from the vulcanizing mold and before the tire has been inflated, Fig. 2 is a sectional view of the tire constructed in accordance with the invention, showing the tire inflated and mounted on a rim to illustrate the oblate shape the tire takes upon inflation thereof, Fig. 3 is an enlarged, partial sectional view of the crown portion of a tire constructed in accordance with the present invention showing the details of the cord reinforcing in this region, and Fig. 4 is a plan view of a portion of a tire constructed in accordance with the present invention with parts thereof broken away to show the crown angle of the various layers of cord fabric reinforcing.

Referring to the drawings, and in particular to Figs. 1 and 2, the tire of the present invention from outward appearance is similar to a conventional tire.

Unlike a conventional tire, however, the total thickness of the tread portion and under tread 10, denoted by the letter "T" in Fig. 3, as measured at the crown of the tire radially from the surface 12 of the tread 10 to the outermost layer of cord reinforcing fabric is quite small, being not greater than 0.50 inch and not less than 0.33 inch.

The tread portion 10 of the tire may be made of the same rubber stock as the sidewalls or may be of a laminated construction of which the outer lamination forming the outer wear surface is formed of a good wear resistant stock and the inner lamination adjacent the carcass is of a more flex or crack resistant stock similar to that of the sidewalls. This latter construction is commonly referred to as a "base and cap" construction. Sidewalls 13 are of conventional thickness. The term "rubber" is used herein in its generic sense to mean natural rubber, synthetic rubber and blends thereof.

The radius of curvature of the outer tread surface 12, commonly referred to as "tread radius" and denoted in the drawings by the dimension $r$ in Fig. 2 when the tire is mounted on a standard rim and inflated to the recommended pressure for maximum load as defined in the 1952–1953 Handbook of the Tire and Rim Association, between 100 and 200% of the tire section "S."

The depths of the anti-skid grooves 10a formed in the tread of the tire are not less than 0.30 inch and unlike a conventional tire, the undertread portion of the tread i. e. the layer of rubber between the bases of the anti-skid grooves and the carcass, is quite thin, being of maximum thickness at the crown of the tire as denoted by the letter "U" in Fig. 3 of .070 inch and having a minimum thickness just sufficient to completely cover the outermost layer of the cord reinforcing of the carcass. It has heretofore been felt that it was necessary to have a rather thick layer of undertread rubber to prevent cracking in the bases of the anti-skid grooves and to prevent cut growth. We have found, however, that by extending the groove to a point close to the outermost layer of the cord reinforcing, particularly in the crown region of the tire, that the undertread can be made very thin without undue cracking in the bases of the grooves or undue cut growth.

The tire includes four body plies, 14, 15, 16 and 17 and a breaker ply 18. The body plies, 14, 15, 16 and 17 extend from bead to bead of the tire and are wrapped around inextensible bead wire bundles 19 and 20 and anchored thereto during vulcanization in the conventional manner. The breaker ply 18 extends beneath the tread 10 and undertread 11 from points adjacent each of the shoulders of the tread. The body plies 14, 15, 16 and 17 and the breaker ply 18 are formed of a tire cord fabric of the usual construction, i. e., weftless or with a weakened weft or filler thread which will break upon shaping of the tire. The cord fabric of the body plies and the breaker ply are of a material that is not adversely affected by moisture, mildew or subject to attack by other fungus. Cotton and rayon, as presently known, are not suitable for this purpose, though it is conceivable that a treatment therefore might be discovered which would render them suitable. Linear polyamides (nylon) or linear polymeric ethylene terephthalates (Dacron) are suitable. The individual cords of the fabric should not have a stretch in excess of 10% at 10 pounds load. A prestretched, heat-set, nylon cord having a stretch of approximately 9% at 10 pounds load has been found to be very satisfactory. The strength of the cord fabric should be at least that of cord fabric used in conventional passenger car tires.

The spacing of the individual cords of the body plies 14, 15, 16 and 17 is conventional for tire construction, i. e., the space between the individual cords of the fabric is one-half the width or less of the individual cords thereof. The space between the individual cords of the breaker ply 18, however, is much greater, being between 1 and 3 times the width of the individual cords. A nylon cord fabric having approximately 33 to 36 ends per inch and formed of 840 denier cords having a twist for yarn of 12.60 turns per inch, a ply twist of 11.50 turns per inch and a stretch of approximately 9% at 10 pounds load has been found to be very satisfactory for the body plies and a similar nylon cord fabric having about 18 ends per inch has been found to be very satisfactory for the breaker ply.

The body plies 14, 15, 16, 17 and the breaker ply are laid in alternate directions at a crown angle, identified by the letters C and D respectively in Fig. 4, of between 25° and 34° when the tire is uninflated. This is a much lower crown angle than that normally used in conventional passenger car tires. Because of this low crown angle of the body plies and breaker ply, the tire takes an oblate shape as shown in Fig. 2, when the tire is mounted on a rim and inflated.

The tire is preferably molded in a mold having a "deck" dimension, i. e. a distance between the bead forming portion of the mold to the surface of the mold elements forming the bases of the anti-skid grooves 15, of at least 100% of the dimension of the transverse section of the mold, so that the tire is molded to a shape such that the distance between the beads of the tire to the bases of the anti-skid grooves, as denoted by the letter H in Fig. 1, is not less than the tire section, as denoted by the letter S in Fig. 1. When the tire is mounted on a rim and inflated, it assumes, because of the low crown angle of the body plies and breaker ply, an oblate shape as shown in Fig. 2, in which the distance between the beads and the base of the center anti-skid grooves, denoted by the letter H in Fig. 2, is substantially less than the tire section, denoted by the letter S in Fig. 2, with the result that the tread 10 is placed under compression, thereby further minimizing groove cracking and cut growth. The tire is otherwise fabricated and vulcanized in the conventional manner.

After extensive tests it has been found that a tire constructed as above described will have such characteristics as softness of ride, steering ease, steering response and tread wear, equal to or superior to those of a conventional passenger car tire and in addition may be operated for comparatively long periods of time at extremely high speeds, i. e. speeds of 95 to 105 miles per hour, without failure. The combination of structural features resulting in the desired characteristics as described is applicable both to tires intended to be used with an inner tube and without an inner tube, i. e. tubeless.

While a preferred form of the invention has been shown and described, it is to be understood that this is for the purpose of illustration and that changes may be made therein without departing from the spirit and scope of the invention.

Having thus described our invention, what we claim and desire to protect by Letters Patent is:

1. A pneumatic tire having a tread, an undertread and sidewalls of a vulcanized rubber stock, four body plies of a cord fabric of a moisture resistant material, a breaker ply of cord fabric of a moisture resistant material forming the outermost reinforcing ply in the crown region of the tire, said materials being selected from the group including linear polyamides and linear polymeric ethylene terephthalates, and spaced annular bead wire bundles to which the body plies are anchored, said tread having a tread radius of between 100 and 200% of the tire section when the tire is mounted on a rim and inflated, the overall thickness of the tread and undertread at the crown of the tire being from between .33 to .50 inch and the undertread being of a maximum thickness at the crown of the tire of not greater than .070 inch and a minimum thickness sufficient to completely cover the breaker ply, the tread having anti-skid grooves formed in the surface thereof, said grooves having a minimum depth of .30 inch, the individual cords of the cord fabric of the body plies and the breaker having a stretch at 10 pounds load of not greater than 10%, the cords of the body plies and the breaker extending at a crown angle of between 25° and 34° when the tire is uninflated, the space between adjacent cords of the breaker ply being between one and three times the width of the individual cords thereof, the height of said tire from the beads thereof to the bases of the anti-skid grooves being not less than the tire section when the tire is uninflated.

2. A pneumatic tire having a tread of vulcanized wear resistant rubber stock, an undertread and sidewalls of a vulcanized crack resistant stock, four body plies of nylon cord fabric, a breaker ply of nylon cord fabric forming the outermost reinforcing ply, and spaced annular bead wire bundles to which the carcass is anchored, said tread having a tread radius of between 100 and 200% of the tire section when the tire is mounted on a rim and inflated, the overall thickness of the tread and undertread at the crown of the tire being from between .33 inch to .50 inch and the undertread being of a maximum thickness at the crown of the tire of not greater than .070 inch and of a minimum thickness sufficient to cover the breaker ply, the tread having anti-skid grooves formed in the surface thereof, said grooves having a minimum depth of .30 inch, the individual nylon cords of the cord fabric of the body plies and breaker ply having a stretch at 10 pounds load of not greater than 10%, the individual nylon cords of the cord fabric of the body plies and breaker ply extending at a crown angle of between 25° and 34° when the tire is uninflated, the space between adjacent nylon cords of the breaker ply being between two and three times the width of the individual cords thereof, the height of said tire from the beads thereof to the bases of the anti-skid grooves being not less than the tire section when the tire is uninflated.

References Cited in the file of this patent

UNITED STATES PATENTS

| | | |
|---|---|---|
| 1,211,958 | Overman | Jan. 9, 1917 |
| 1,293,528 | Palmer | Feb. 4, 1919 |
| 1,337,443 | Demas | Apr. 20, 1920 |
| 1,842,353 | Lorentz | Jan. 19, 1932 |
| 2,094,636 | Bull | Oct. 5, 1937 |
| 2,600,231 | Ewart | June 10, 1952 |
| 2,650,642 | Reheiser | Sept. 1, 1953 |

FOREIGN PATENTS

| | | |
|---|---|---|
| 649,819 | Great Britain | Jan. 31, 1951 |
| 679,824 | Great Britain | Sept. 24, 1952 |